(12) United States Patent
Ka et al.

(10) Patent No.: US 7,365,144 B2
(45) Date of Patent: Apr. 29, 2008

(54) POLYPROPYLENE COMPOSITE COMPOSITION

(75) Inventors: Suk Sun Ka, Yongin-si (KR); Myoung Seok Kim, Yongin-si (KR); Han Seok Song, Daejeon (KR)

(73) Assignees: Hyundai Mobis Co., Ltd., Seoul (KR); GS Caltex Corporation, Seoul (KR)

( * ) Notice: Subject to any disclaimer, the term of this patent is extended or adjusted under 35 U.S.C. 154(b) by 0 days.

(21) Appl. No.: 11/521,552

(22) Filed: Sep. 15, 2006

(65) Prior Publication Data
US 2007/0191530 A1    Aug. 16, 2007

(30) Foreign Application Priority Data
Feb. 16, 2006    (KR)    .................... 10-2006-0015164

(51) Int. Cl.
*C08F 110/06*    (2006.01)
(52) U.S. Cl. .................. 526/351; 526/335; 526/318.2; 428/447; 428/325
(58) Field of Classification Search .............. 526/351, 526/335, 318.2; 428/447, 325
See application file for complete search history.

(56) References Cited

U.S. PATENT DOCUMENTS

| 5,597,522 A * | 1/1997 | Curzon et al. | ......... 264/177.16 |
| 2002/0142175 A1 * | 10/2002 | Hase et al. | ................. 428/447 |
| 2002/0162797 A1 | 11/2002 | Johnson et al. | |
| 2006/0105053 A1 | 5/2006 | Max et al. | |

OTHER PUBLICATIONS

U.S. Appl. No. 11/521,551, filed Sep. 15, 2006, and entitled "Polypropylene Composite Composition".
U.S. Appl. No. 11/468,886, filed Aug. 31, 2006, and entitled "Apparatus for Processing Polypropylene Compound Containing Glass Bubble".

* cited by examiner

*Primary Examiner*—Ling-Sui Choi
(74) *Attorney, Agent, or Firm*—Greenblum & Bernstein, P.L.C.

(57) ABSTRACT

Disclosed herein is a polypropylene composite composition. The polypropylene composite composition comprises 50 to 80% by weight of polypropylene, 6 to 30% by weight of talc, 10 to 30% by weight of a rubber, 3 to 15% by weight of glass bubbles, and 0.5 to 7% by weight of maleic anhydride polypropylene (MAH-PP).

According to the composition, the compatibility between the glass bubbles and the polypropylene can be improved, thus enabling effective use of the glass bubbles. Therefore, when the composition is used to produce automotive components, such as automotive interior components, the fuel efficiency of automobiles can be improved due to weight reduction effects of polypropylene composites. In addition, since the composition uses colorless and odorless glass bubbles, it can remove an unpleasant smell generated from conventional interior components using talc and is thus environmentally friendly.

Furthermore, since glass bubbles used in the composition offer surface embossing effects, the adhesiveness of polyurethane foams is improved and thus the production of automotive components can be simplified.

10 Claims, 2 Drawing Sheets

POLYPROPYLENE COMPOSITE COMPOSITION

BACKGROUND OF THE INVENTION

1. Field of the Invention

The present invention relates to a polypropylene composite composition, and more specifically to a polypropylene composite composition using glass bubbles as fillers for weight reduction.

2. Description of the Related Art

In recent years, the automotive industry has succeeded in achieving convenience and environmental protection through extensive and intensive research and development. In this connection, main issues raised in the automotive component industry are concentrated on weight reduction, modulation and electronization. Automobiles, which have long been recognized as simple transportation means, are becoming living necessaries that provide various functions, such as safety, convenience, silence and sensibility, to customers. As the production and sales of hybrid automobiles are encouraged in terms of fuel efficiency, air pollution problems and oil prices, there is a rapidly increasing demand for lightweight and high-performance automobiles. Particularly, developments of high-performance plastics using glass fibers and carbon fibers have led to a reduction in the weight of car body components, such as trunks and hoods. On the other hand, governmental regulations in many countries, particularly European countries, have restricted the contents of environmentally harmful substances, particularly heavy metals, including cadmium (Cd), lead (Pb), mercury (Hg) and hexavalent chromium ($Cr^{6+}$), discharged from automobiles and have enforced recycling of the substances. As a result, the weight of plastics used in each car has been steadily increasing.

Under such circumstances, continuous research has been conducted on the weight reduction through the integration and unification of materials, and replacement with olefin plastics of low specific gravity by auto makers, mainly Toyota and Nissan Motors.

On the other hand, instrument panels, which are representative automotive interior components, are divided into two types, i.e. foam type and integral hard type. The hard type instrument panels are produced by injection molding a PPF material, which is produced by compounding PP, rubbers and talc, followed by painting. Meanwhile, the foam type instrument panels are produced by injection molding a core as a structural material with a blend of PC and ABS as an engineering plastic. In recent years, the use of foamable core products, to which PPF materials are applied, has increased in view of integration of materials and reduction of cost and weight. However, the problems of such foamable core products are negligible weight reduction effects and increased number of defects due to low resin fluidity and poor dimensional stability during foaming. Thus, there is a growing interest in fillers capable of replacing talc. Glass bubbles produced by 3M have drawn considerable attention as fillers for weight reduction.

Glass bubbles are three-dimensional hollow microspheres and are fillers composed essentially of soda-lime borosilicate. Glass bubbles have a particle size of 14 to 135 μm and a specific gravity of 0.125 to 0.6. For purposes of comparison with glass bubbles, the kind and specific gravity of several fillers used in plastics are presented in Table 1 below.

TABLE 1

| Filler | Specific gravity | Filler | Specific gravity |
|---|---|---|---|
| $CaCO_3$ | 2.70 | Glass Fiber | 2.50 |
| Talc | 2.90 | $TiO_2$ | 4.10 |
| Kaolin | 2.60 | $Al_2O_3$ | 2.50 |
| $BaSO_4$ | 4.60 | Glass Beads | 2.50 |
| Mica | 2.75 | Glass bubble | 0.125-0.60 |

As can be seen from the data shown in Table 1, a glass bubble has a lower specific gravity than other fillers used in plastics. Based on this advantage, glass bubbles are partially used for weight reduction of components through partial replacement of high-weight fillers, such as talc and glass fibers, used in plasticizers for PVC coating, epoxy structural foams, sheet molding compounds (SMCs), bulk molding compounds (BMCs), and reaction injection moldings (RIMs). In addition to weight reduction effects due to low specific gravity, the use of glass bubbles is expected to contribute to decreased amount of resins used, good dimensional stability, less deformation after molding, and improvement of processability, moldability, heat insulation performance and water resistance. Car components that benefit from the use of glass bubbles include body side moldings (TPU), headlight housings (PC), gas tank floats (Nylon), fan shrouds (Nylon), FEM carriers (Nylon), and the like.

However, since polypropylene is incompatible with glass bubbles, the use of a combination of polypropylene and glass bubbles as a filler causes deterioration of mechanical properties of polypropylene compound materials, such as IZOD impact strength, flexural modulus and flexural strength, tensile strength, elongation and thermal deformation temperature. For these problems, composites using glass bubbles as fillers have not yet been put to practical use.

Thus, there is a strong need to develop a composite composition for weight reduction of automotive components, and particularly, a composite composition capable of improving the compatibility between polypropylene and glass bubbles.

SUMMARY OF THE INVENTION

The present invention has been made in view of the above problems, and it is an object of the present invention to provide a polypropylene composite composition with improved mechanical properties, such as tensile strength and flexural modulus, through improvement of compatibility between polypropylene and glass bubbles.

In accordance with one aspect of the present invention for achieving the above object, there is provided a polypropylene composite composition comprising 50 to 80% by weight of polypropylene, 6 to 30% by weight of talc, 10 to 30% by weight of a rubber, 3 to 15% by weight of glass bubbles, and 0.5 to 7% by weight of maleic anhydride polypropylene (MAH-PP).

In accordance with another aspect of the present invention, there is provided an automotive component produced by molding the composition.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The present invention will now be described in greater detail.

The present invention provides a polypropylene composite composition comprising 50 to 80% by weight of polypropylene, 6 to 30% by weight of talc, 10 to 30% by weight of a rubber, 3 to 15% by weight of glass bubbles, and 0.5 to 7% by weight of maleic anhydride polypropylene (hereinafter, referred to simply to as 'MAH-PP').

The composition of the present invention comprises glass bubbles as fillers. Glass bubbles are particularly suitable for use as fillers for weight reduction of materials due to their low specific gravity (0.125-0.60).

If the glass bubbles used herein have a large particle size compared to that of the talc, the physical properties of polypropylene composites, such as IZOD impact strength and flexural modulus, are deteriorated. Accordingly, it is preferred that the average particle size of the glass bubbles be limited to the range of 14 to 18 μm.

In the case where glass bubbles are used as domains in a composition using polypropylene as a matrix, it is preferred to use an additive to improve the compatibility between the glass bubbles and the polypropylene. As the additive, MAH-PP can be used. The MAH-PP is not particularly limited, and preferably has an average molecular weight of 100 to 5,000.

Figure 6:
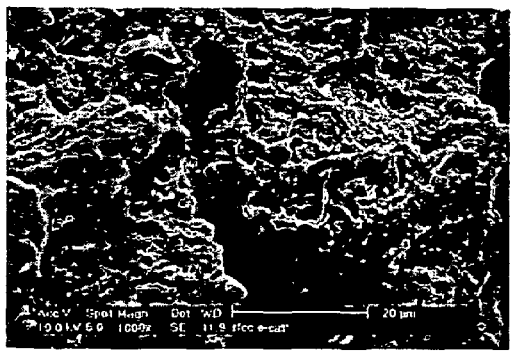
FIG. 6 is a scanning electron microscope (SEM) micrograph showing the morphology of a polypropylene composite using maleic anhydride polypropylene (MAH-PP).

When MAH-PP is used as the additive, the hydrocarbon moiety of the MAH-PP reacts with the polypropylene and the other moiety of the MAH-PP reacts with the glass bubbles to allow the MAH-PP to crosslink the polypropylene and the glass bubbles. This crosslinking improves the compatibility and adhesion between the polypropylene and the glass bubbles, leading to an improvement in the mechanical properties of the polypropylene composite. As shown in FIG. 6, the addition of the MAH-PP induces the adhesion of a relatively large amount of the polypropylene to the surface of the glass bubbles, resulting in the preferred morphology.

Any talc may be used in the composition of the present invention without any particular limitation. Particularly, fine talc having an average particle size of 1 μm or less or talc for stiffness reinforcement having an average particle size of 1 to 1.5 μm is preferably used. The fine talc is uniformly distributed within the polypropylene resin and maximizes the contact area between the polypropylene and the glass bubbles, resulting in a considerable improvement in IZOD impact strength. Meanwhile, the use of talc for stiffness reinforcement is effective in improving the stiffness of polypropylene composites while maintaining the IZOD impact strength of them.

The present invention also provides an automotive component produced by molding the composition.

The kind of the automotive component is not particularly restricted, and examples of preferred automotive components include automotive interior components, particularly, instrument panels. In this case, since the glass bubbles as fillers are dispersed on the surface of the polypropylene resin, the surface is pitted (embossing effects), thereby solving poor paint adhesion, which is a disadvantage of polypropylene materials. As a result, the composition of the present invention removes the necessity of additional processing, e.g., primer coating and flame treatment, for improving the paint adhesion, thus simplifying the production of automotive components.

Hereinafter, the present invention will be described in more detail with reference to the following preferred examples. However, these examples are given for the purpose of illustration and are not intended to limit the present invention

EXAMPLES

Example 1

Preparation of Polypropylene Composite Composition

58% by weight of polypropylene, 20% by weight of a rubber, 15% by weight of talc, 5% by weight of glass bubbles, and 2% by weight of MAH-PP were used to prepare a polypropylene composite composition.

Specifically, first, the polypropylene, the talc, the rubber and the MAH-PP were added to a main hopper of a twin-screw extruder. Thereafter, the glass bubbles were added to the mixture through a side feeding hopper to prepare the desired polypropylene composite composition.

Experimental Example 1

Evaluation of Physical Properties at Different Contents of Glass Bubbles with or without Addition of MAH-PP To confirm changes in the physical properties of the polypropylene composite (hereinafter, referred to as 'PPF material') with or without addition of MAH-PP, the basic physical properties of composites comprising different contents of the talc and the glass bubbles were evaluated. The results are shown in Table 2 and FIGS. 1 and 2.

At this time, changes in physical properties were compared by fixing the rubber content in the PPF to 15 wt %.

TABLE 2

| Components | Unit | Control | A-1 | A-2 | A-3 | A-4 | A-5 |
|---|---|---|---|---|---|---|---|
| Polypropylene | wt % | 60 | 67.9 | 71.8 | 75.7 | 78.3 | 76.3 |
| Talc | wt % | 25 | 15 | 10 | 5 | — | — |
| Glass bubbles | wt % | — | 2.1 | 3.2 | 4.3 | 6.7 | 6.7 |
| Rubber | wt % | 15 | 15 | 15 | 15 | 15 | 15 |
| MAH-PP | Wt % | — | — | — | — | — | 2 |
| Melt index (MI) | g/10 min. | 25.1 | 27.3 | 28.7 | 29.8 | 30.3 | 29.6 |
| Specific gravity | — | 1.08 | 0.97 | 0.92 | 0.88 | 0.84 | 0.84 |
| Tensile strength | kgf/cm$^2$ | 136 | 147 | 143 | 137 | 124 | 153 |
| Flexural strength | Kgf/cm$^2$ | 244 | 243 | 230 | 209 | 188 | 232 |
| Flexural modulus | kgf/cm$^2$ | 13,500 | 11,500 | 10,600 | 8,500 | 7,600 | 8,400 |
| Izod impact strength | kgf · cm/cm | 12.3 | 6.4 | 6.8 | 7.2 | 6.1 | 7.0 |

Figure 1:
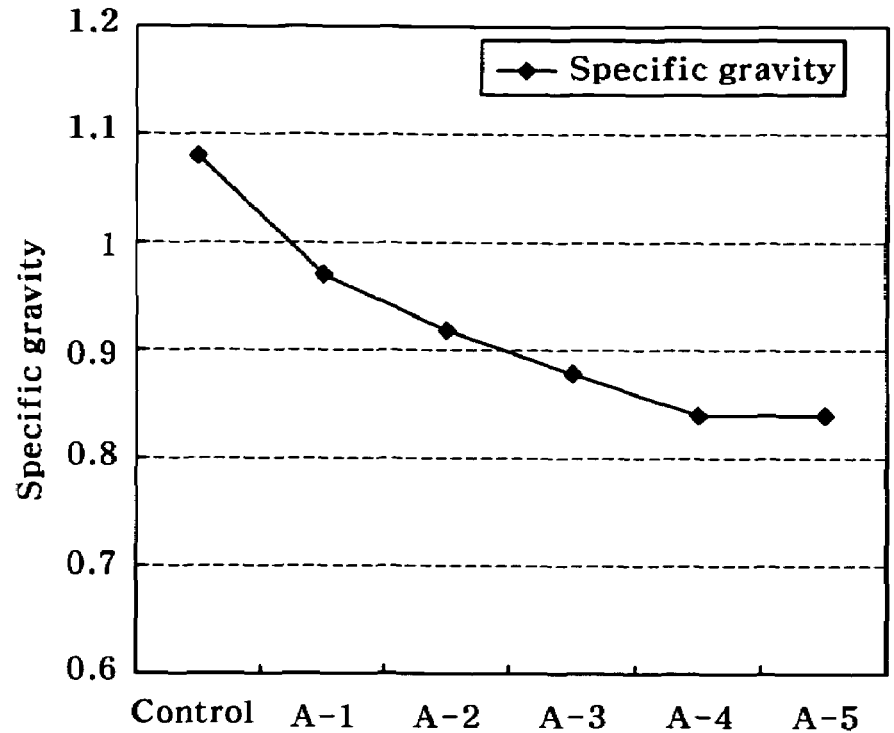
FIG. 1 is a graph showing changes in the specific gravity of polypropylene composites at different contents of glass bubbles and with or without the addition of maleic anhydride polypropylene.
Figure 2:
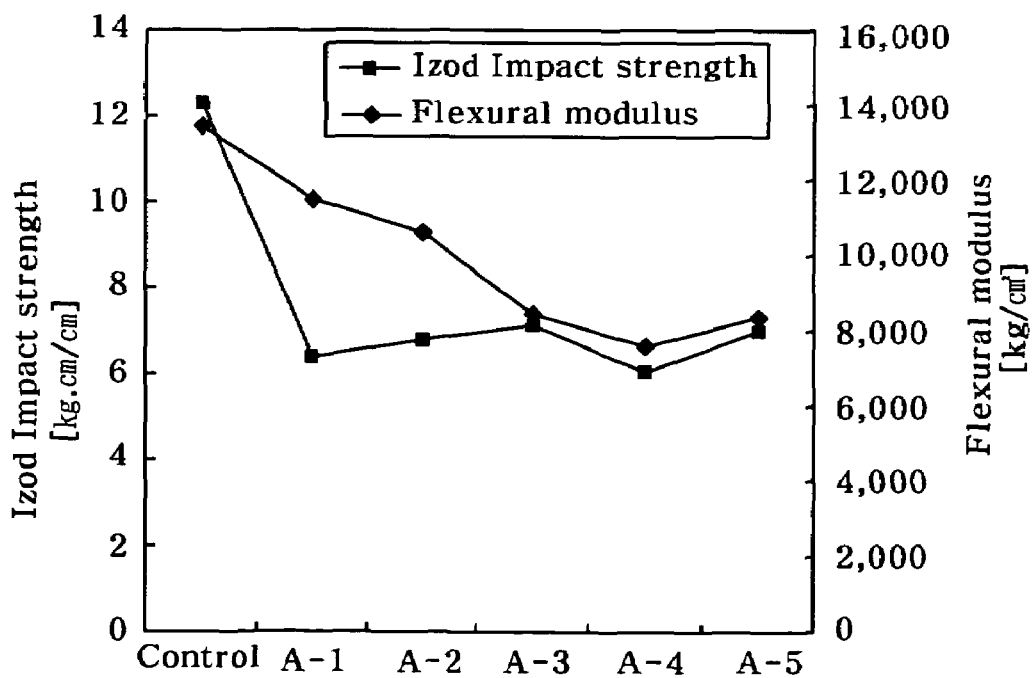
FIG. 2 is a graph showing changes in the IZOD impact strength and flexural modulus of polypropylene composites at different contents of glass bubbles and with or without the addition of maleic anhydride polypropylene.

Table 2 and FIGS. 1 and 2 show that the specific gravity of the PPF materials was decreased linearly and the IZOD impact strength and the flexural modulus of the PPF materials were decreased from A-1 to A-4 with increasing content of the glass bubbles (with decreasing content of the talc). Particularly, the PPF materials showed a slight decrease in IZOD impact strength but showed a linear decrease in flexural modulus with increasing content of the glass bubbles. A-5, which comprises 2% MAH-PP (modified PP) as an additive, showed improved impact strength, flexural modulus and tensile strength when compared to A-4, which comprises 6.7% of the glass bubbles. Therefore, it is estimated that MAH-PP plays a positive role in improving the adhesion between the polypropylene (PP) and the glass bubbles, resulting in an improvement in physical properties.

Experimental Example 2

Comparison of Physical Properties at Different Particle Sizes of Glass Bubbles

To improve the deteriorated physical properties of the PPF materials by the glass bubbles, a new type of glass bubbles (average particle size: 18 µm), which had a smaller average particle size than the glass bubbles S60HS (average particle size: 30 µm, 3M) used above, was used. The results are shown in Table 3.

TABLE 3

| Components | Unit | B-1 | B-2 |
|---|---|---|---|
| Polypropylene | wt % | 60 | 60 |
| Rubber | wt % | 20 | 20 |
| Talc | Wt % | 15 | 15 |
| GB | Wt % | — | 5 |
| S-GB | Wt % | 5 | — |
| MI | g/10 min. | 12.5 | 12.1 |
| Specific gravity | — | 0.98 | 0.98 |
| T/S | kg/mm$^2$ | 190 | 194 |
| Elongation | % | 437 | 425 |
| F/S | kg/cm$^2$ | 308 | 300 |
| F/M | kg/cm$^2$ | 18800 | 18900 |
| Izod | kg · cm/cm | 22.2 | 15.8 |
| HDT | 15.8° C. | 129 | 129 |

*Note:
GB: glass bubbles having a larger particle size,
S-GB: glass bubbles having a smaller particle size Table 3 shows changes in the physical properties of B-1 and B2 at different particle sizes of the glass bubbles. Specifically, B-1 using S-GB (average particle size: 18 µm) showed flexural modulus (F/M) and tensile strength (T/S) values similar to those of B-2 using S60HS (average particle size: 30 µm, 3M). B-1 showed a 40% increase in IZOD impact strength as compared to B-2. From these results, it is estimated that the glass bubbles having a smaller particle size are more uniformly dispersed within the polypropylene matrix, resulting in improvement of impact characteristics.

Figure 3:
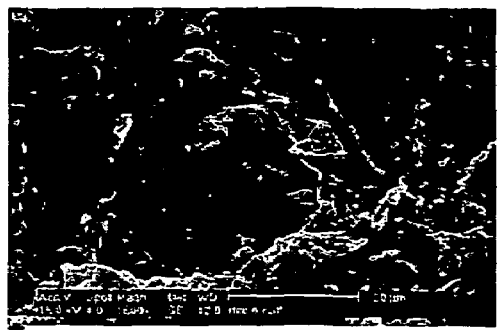
FIG. 3 is a scanning electron microscope (SEM) micrograph showing the morphology of a polypropylene composite using glass bubbles with an average particle size of 18 μm.
Figure 4:
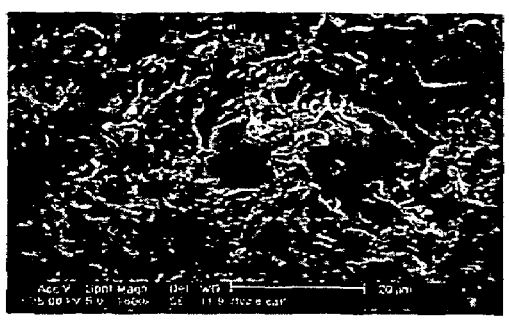
FIG. 4 is a scanning electron microscope (SEM) micrograph showing the morphology of a polypropylene composite using glass bubbles with an average particle size of 30 μm.

From the micrographs of FIGS. 3 and 4, it could be confirmed that the PPF material (FIG. 3) using glass bubbles with a smaller particle size had better morphology.

Experimental Example 3

Comparison of Morphologies with or without Addition of MAH-PP

To confirm the morphology of the PPF material using MAH-PP to improve the compatibility between the polypropylene and the glass bubbles, changes in the surface characteristics of the PPF material were observed under a scanning electron microscope (SEM). The results are shown in FIGS. 5 and 6.

Figure 5:
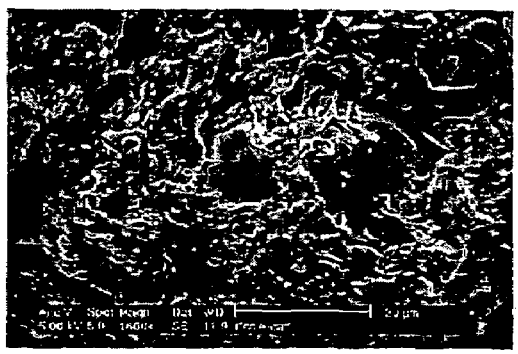
FIG. 5 is a scanning electron microscope (SEM) micrograph showing the morphology of a polypropylene composite using no maleic anhydride polypropylene.

FIG. 5 is a micrograph showing the morphology of the polypropylene composite using no MAH-PP, and FIG. 6 is a micrograph showing the morphology of the polypropylene composite using MAH-PP.

The micrographs of FIGS. 5 and 6 reveal that the addition of MAH-PP induced the adhesion of a relatively large amount of the polypropylene to the surface of the glass bubbles, indicating improved compatibility between the glass bubbles and the polypropylene.

Experimental Example 4

Comparison of Changes in Physical Properties at Different Particle Sizes of Talc When the glass bubbles and the polypropylene were compounded, changes in mechanical properties were evaluated at different particle sizes of the talc. At this time, the polypropylene, the rubber and the glass bubbles were used in the same amounts. General talc (average particle size: 4-5 µm), fine talc (average particle size: 1 µM or less) and talc for stiffness reinforcement (average particle size: 1-1.5 µm) were used. The results are shown in Table 4.

TABLE 4

| Components | Unit | C-1 | C-2 | C-3 |
|---|---|---|---|---|
| Polypropylene | wt % | 58 | 58 | 58 |
| Rubber | wt % | 20 | 20 | 20 |
| General talc | wt % | 15 | — | — |
| Fine talc | wt % | — | 15 | — |
| Talc for stiffness | wt % | — | — | 15 |

TABLE 4-continued

| Components | Unit | C-1 | C-2 | C-3 |
|---|---|---|---|---|
| reinforcement | | | | |
| S-GB | wt % | 5 | 5 | 5 |
| MAH-PP | Wt % | 2 | 2 | 2 |
| MI | g/10 min. | 17.3 | 17.0 | 10.1 |
| Density | g/cc | 0.98 | 0.98 | 0.98 |
| Tensile strength (Y) | kg/cm$^2$ | 184 | 185 | 204 |
| Elongation | % | 202 | 300 | 483 |
| Izod 23° C. | kg · cm/cm | 28.7 | 30.5 | 28.1 |
| Izod −10° C. | kg · cm/cm | 5.9 | 5.9 | 5.6 |
| F/M | kg/cm$^2$ | 18200 | 18160 | 19100 |
| F/S | kg/cm$^2$ | 285 | 285 | 316 |
| R.H | R Scale | 58 | 55 | 60 |
| HDT | ° C. | 124 | 122 | 132 |

As can be seen from the results of Table 4, the PPF material using the talc for stiffness reinforcement showed an improvement in physical properties, such as flexural strength, flexural modulus and thermal deformation temperature, while maintaining the IZOD impact strength. Further, when compared to the general talc and the talc for stiffness reinforcement, the fine talc was uniformly distributed within the polypropylene resin and maximized the contact area between the polypropylene and the glass bubbles, resulting in a considerable improvement in IZOD impact strength As apparent from the above description, when MAH-PP is used as an additive in the polypropylene composite composition of the present invention, the hydrocarbon moiety of the MAH-PP is bonded to the polypropylene and the other moiety of the MAH-PP chemically reacts with the glass bubbles to improve the adhesion between the polypropylene and the glass bubbles, resulting in an improvement in the mechanical properties of the polypropylene composite.

In addition, according to the polypropylene composite composition of the present invention, the adhesion of glass bubbles in a dispersion state to polypropylene as a matrix is improved, resulting in an improvement in the mechanical properties of the composition. As a result, the amount of talc, which is a high-specific gravity filler, used can be reduced, thus reducing the weight of polypropylene composites.

Moreover, when the light-weight composite using glass bubbles is used for automotive interior components, the fuel efficiency of automobiles can be improved due to weight reduction effects of the composite. Since the composition of the present invention uses colorless and odorless glass bubbles, it can remove an unpleasant smell generated from conventional interior components using talc and is thus environmentally friendly.

Furthermore, since glass bubbles used in the composition of the present invention offer surface embossing effects, the adhesiveness of polyurethane foams is improved and thus the production of automotive components can be simplified Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A polypropylene composite composition comprising 50 to 80% by weight of polypropylene, 6 to 30% by weight of talc, 10 to 30% by weight of a rubber, 3 to 15% by weight of glass bubbles, and 0.5 to 7% by weight of maleic anhydride polypropylene (MAH-PP).

2. The polypropylene composite composition according to claim 1, wherein the maleic anhydride polypropylene has an average molecular weight of 100 to 5,000.

3. The polypropylene composite composition according to claim 1, wherein the glass bubbles have an average particle size of 14 to 18 μm.

4. The polypropylene composite composition according to claim 1, wherein the talc is fine talc having an average particle size of 1 μm.

5. The polypropylene composite composition according to claim 1, wherein the talc is talc for stiffness reinforcement having an average particle size of 1 to 1.5 μm.

6. An automotive component produced by molding the composition according to claim 1.

7. An automotive component produced by molding the composition according to claim 2.

8. An automotive component produced by molding the composition according to claim 3.

9. An automotive component produced by molding the composition according to claim 4.

10. An automotive component produced by molding the composition according to claim 5.

* * * * *